United States Patent
Prandi et al.

(10) Patent No.: US 8,051,698 B2
(45) Date of Patent: Nov. 8, 2011

(54) MICRO-ELECTRO-MECHANICAL GYROSCOPE WITH OPEN-LOOP READING DEVICE AND CONTROL METHOD THEREOF

(75) Inventors: Luciano Prandi, Bellinzago Novarese (IT); Carlo Caminada, Rho (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 736 days.

(21) Appl. No.: 12/166,936

(22) Filed: Jul. 2, 2008

(65) Prior Publication Data

US 2010/0000289 A1    Jan. 7, 2010

(30) Foreign Application Priority Data

Jul. 5, 2007    (EP) .................................. 07425417

(51) Int. Cl.
*G01C 17/38*    (2006.01)
(52) U.S. Cl. ........................................................ 73/1.77
(58) Field of Classification Search .................. None
See application file for complete search history.

(56) References Cited

U.S. PATENT DOCUMENTS

| | | | |
|---|---|---|---|
| 4,884,446 A * | 12/1989 | Ljung | ..................... 73/504.12 |
| 5,608,351 A | 3/1997 | Ward | |
| 6,553,833 B1 | 4/2003 | Funk et al. | |
| 2004/0206176 A1 | 10/2004 | Willig et al. | |
| 2007/0144255 A1 | 6/2007 | Handrich et al. | |

* cited by examiner

*Primary Examiner* — Robert Raevis
(74) *Attorney, Agent, or Firm* — Lisa K. Jorgenson; E. Russell Tarleton; Seed IP Law Group PLLC

(57) ABSTRACT

A micro-electro-mechanical gyroscope includes a first mass, which is able to oscillate along a first axis with respect to a fixed body, an inertial sensor having a second mass constrained to the first mass so as to oscillate along a second axis in response to a rotation of the gyroscope, a driving device coupled to the first mass that forms a control loop for maintaining the first mass in oscillation at a resonance frequency, and a reading device that detects displacements of the second mass along the second axis, which includes a charge amplifier for converting charge packets supplied by the inertial sensor into a charge-integration signal, and a low-pass filter. A calibration stage enables modification of a voltage between the second mass and the fixed body so as to minimize a component at a frequency that is twice the resonance frequency in the charge-integration signal.

36 Claims, 4 Drawing Sheets

MICRO-ELECTRO-MECHANICAL GYROSCOPE WITH OPEN-LOOP READING DEVICE AND CONTROL METHOD THEREOF

BACKGROUND

1. Technical Field

The present disclosure relates to a micro-electro-mechanical gyroscope with open-loop reading device and a corresponding method for controlling a micro-electro-mechanical gyroscope.

2. Description of the Related Art

As is known, the use of micro-electro-mechanical systems (MEMS) has encountered an increasing development in several sectors of technology and has yielded encouraging results, especially in the production of inertial sensors, micro-integrated gyroscopes, and electro-mechanical oscillators for a wide range of applications.

MEMS systems of this type are usually based upon micro-electro-mechanical structures having at least one mass, which is connected to a fixed body (stator) through springs and is movable with respect to the stator according to pre-determined degrees of freedom. The movable mass and the stator are capacitively coupled by a plurality of respective comb-fingered and mutually facing electrodes so as to form capacitors. The movement of the movable mass with respect to the stator, for example on account of an external stress, modifies the capacitance of the capacitors. From here it is possible to trace back to the relative displacement of the movable mass with respect to the fixed body and hence to the force applied. Instead, by supplying appropriate biasing voltages, it is possible to apply an electrostatic force to the movable mass in order to set it in motion. In addition, in order to provide electro-mechanical oscillators, the frequency response of inertial MEMS structures is exploited, which is typically of a second-order low-pass type, with a resonance frequency. By way of example, FIGS. 1 and 2 show the evolution of the magnitude and phase of the transfer function between the force applied to the movable mass and displacement thereof with respect to the stator in an inertial MEMS structure.

MEMS gyroscopes, in particular, have a more complex electro-mechanical structure, which includes two masses, movable with respect to the stator and coupled to one another so as to have one relative degree of freedom. The two movable masses are both capacitively coupled to the stator. One of the masses is dedicated to driving and is maintained in oscillation at the resonance frequency. The other mass is driven in the oscillatory motion and, in the case of rotation of the microstructure with respect to a pre-determined gyroscopic axis with an angular velocity, is subject to a Coriolis' force proportional to the angular velocity itself. In practice, the driven mass operates as an accelerometer, which enables detection of the Coriolis' force and acceleration and hence tracing-back to the angular velocity.

For proper operation, a MEMS gyroscope requires, in addition to the microstructure, a driving device, which has the task of maintaining the movable mass in oscillation at the resonance frequency, and a device for reading the displacements of the driven mass, according to the degree of freedom of the driving mass. Such displacements, in fact, indicate the Coriolis' force and, consequently, the angular velocity and can be detected through electric reading signals correlated to the variations of the capacitive coupling between the driven mass and the stator. As a result of driving at the resonance frequency, the reading signals, caused by the rotation of the gyroscope and correlated to the angular velocity, are in the form of dual-side-band, suppressed-carrier signals (DSB-SC; the carrier is in this case the velocity of oscillation of the driving mass and has a frequency equal to the mechanical resonance frequency).

Since, however, the MEMS gyroscope has a complex structure and the electro-mechanical interactions between the movable masses and stator are frequently non-linear, the useful signal components are frequently superimposed on spurious components, which are not significant for measuring the angular velocity. The spurious components can be due to several causes. For example, reading the capacitance between the movable masses and the stator inherently perturbs the forces caused by driving and by rotation of the microstructure (producing the so-called phenomenon of "electrostatic softening", which in practice modifies the resonance frequency of the micro-electro-mechanical structure). The charge displacements induced and detected, in fact, modify the electrostatic forces between the capacitively coupled elements and affect the dynamics of the system. Other causes of disturbance, which are practically impossible to eliminate, are the imperfections of production and the process dispersions, so that the behavior of real devices differs in a way that is only statistically predictable from the design. A very common defect, for example, depends on the fact that the mass used for driving oscillates in a direction not perfectly coinciding with the degree of freedom envisaged in the design stage. In this case, the defect of driving affects the useful signal, introducing a component of unknown amplitude at the same frequency as that of the carrier and 90° out of phase.

On the other hand, the amplitude of the disturbance components is in many cases significant and cannot be simply neglected without introducing unacceptable distortions.

BRIEF SUMMARY

The disclosure provides a micro-electro-mechanical gyroscope and a corresponding method for controlling a micro-electro-mechanical gyroscope that will enable a reduction in the influence of the disturbance components superimposed on signal components caused by rotation of the gyroscope itself.

In accordance with one embodiment of the present disclosure, a microelectromechanical gyroscope is provided that includes a first mass oscillatable according to a first axis with respect to a fixed body; an inertial sensor, including a second mass, driven by the first mass and constrained so as to oscillate according to a second axis in response to a rotation of the gyroscope; a driving device coupled to the first mass so as to form a feedback control loop and configured to maintain the first mass in oscillation at a resonance frequency; an open-loop reading device coupled to the inertial sensor for detecting displacements of the second mass according to the second axis, the reading device including a charge amplifier for receiving charge packets from the inertial sensor and converting the charge packets into a charge-integration signal, and a low-pass filter for filtering the charge-integration signal; and a calibration stage for modifying a biasing voltage between the second mass and the fixed body so as to minimize a component $2\omega_R$ at a frequency twice the resonance frequency in the charge-integration signal.

In accordance with another embodiment of the present disclosure, a method for controlling a microelectromechanical gyroscope is provided, the method including the steps of providing a first mass oscillatable according to a first axis; coupling an inertial sensor having a second mass to the first mass in such a way that the second mass is driven by the first mass and oscillates according to a second axis in response to a rotation of the gyroscope; feedback controlling a movement of the first mass for maintaining the first mass in oscillation at a resonance frequency; open-loop detecting displacements of the second mass according to the second axis, wherein open-loop detection comprises converting charge packets generated by the inertial sensor into a charge-integration signal and low-pass filtering the charge-integration signal; and modifying a biasing voltage between the second mass and the fixed body so as to minimize a component $2\omega_R$ at a frequency that is twice the resonance frequency in the charge-integration signal where $\omega_R$ represents the resonance frequency.

In accordance with another embodiment of the present disclosure, a device is provided, the device including an inertial sensor coupled to a detection mass that oscillates at a resonance frequency, the inertial sensor adapted to output detection charge packets in response to movement of the detection mass; and a reading device coupled to the inertial sensor to receive the detection charge packets and configured to process the detection charge packets and generate an output signal that has frequency components of twice the resonance frequency removed therefrom.

In accordance with another aspect of the foregoing embodiment, the reading device includes a charge amplifier and a calibration circuit coupled to the charge amplifier, the charge amplifier receiving the detection charge packets and generating a charge-integration signal in response thereto, and the calibration circuit receiving the charge integration signal from the charge amplifier circuit and generating in response thereto a calibration voltage, the calibration voltage received by the charge amplifier and used to determine a bias voltage for the detection mass.

In accordance with another aspect of the foregoing embodiment, the reading device includes a reading signal generator adapted to supply a first reading signal and a second reading signal to respective terminals of the inertial sensor, which are capacitively coupled to the second mass, and wherein the first and second reading signals have the form of square-wave signals having an amplitude that varies sinusoidally at the resonance frequency, respectively in phase and with a phase shift of 180° with respect to oscillations of the first mass along the first axis.

BRIEF DESCRIPTION OF THE SEVERAL VIEWS OF THE DRAWING(S)

For a better understanding of the disclosure, some embodiments thereof are now described, purely by way of non-limiting example and with reference to the attached drawings, in which.

DETAILED DESCRIPTION

In the sequel of the description, reference will be made to use of the disclosed embodiment in a micro-electro-mechanical gyroscope of the "yaw" type. This must not, however, be considered as in any way limiting the scope, since the disclosure may be advantageously exploited for providing MEMS gyroscopes of any type, in particular of the "roll" type, "pitch" type, and with multiple axes (biaxial or triaxial gyroscopes).

For convenience, moreover, the term "frequency" will be used for indicating angular frequencies (pulsations, rad/s). It is understood in any case that a frequency f and the corresponding angular frequency or pulsation $\omega$ are linked by the well-known relation $\omega=2\pi f$.

Figure 1:
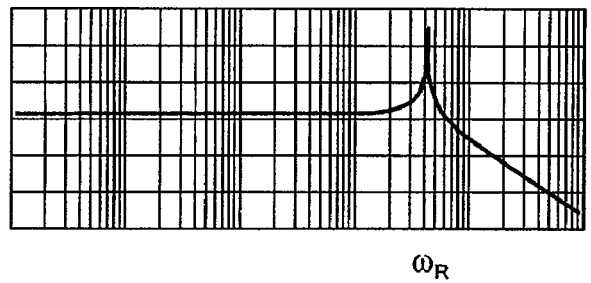
FIGS. 1 and 2 show graphs relating to the frequency response of a micro-electro-mechanical gyroscope.
Figure 2:
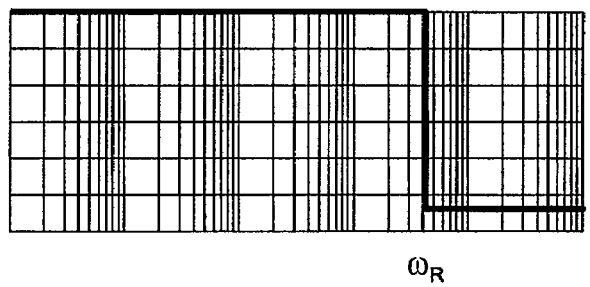
Figure 3:
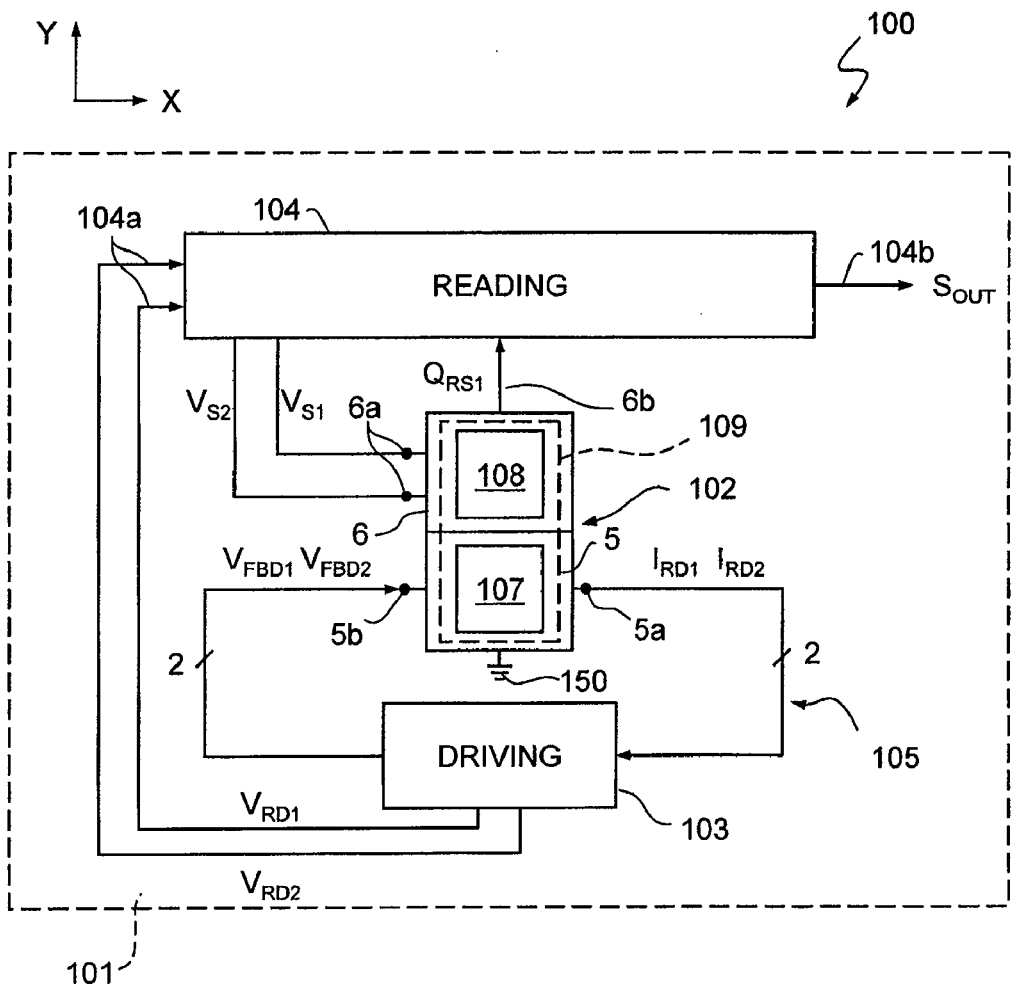
FIG. 3 is a simplified block diagram of a micro-electro-mechanical gyroscope, according to one embodiment of the present disclosure.

A micro-electro-mechanical gyroscope 100, illustrated in a simplified way in the block diagram of FIG. 3, includes a microstructure 102, obtained using MEMS technology, a driving device 103, and a reading device 104, housed on a support 101. The microstructure 102, for example, of the type described in EP-A-1 253 399, filed in the name of the present applicant, is provided with an actuation system 5 and an inertial sensor 6, including respective movable masses made of semiconductor material. More precisely, the actuation system 5 includes a driving mass 107, which oscillates, with respect to a fixed structure or stator 109, about a resting position according to a degree of freedom, in particular along a first axis X. The actuation system 5 is moreover provided with reading outputs 5a (defined by two stator terminals), for detecting displacements of the driving mass 107 along the first axis X, and with actuation inputs 5b (defined by two further stator terminals), for supplying actuation signals and maintaining the driving mass 107 in oscillation at the resonance frequency $\omega_R$, in a known way. The reading outputs 5a and the actuation inputs 5b are capacitively coupled to the driving mass 107 in a known way, by comb-fingered electrodes (here not shown).

The inertial sensor 6 has a detection axis directed along a second axis Y perpendicular to the first axis X and includes a detection mass 108, mechanically connected to the driving mass 107 by springs (here not shown) so as to be driven in motion with respect to the stator 109 along the first axis X when the driving mass 107 is excited. In addition, the detection mass 108 is movable with respect to the driving mass 107 and with respect to the stator 109 in the direction of the second axis Y and hence has a further degree of freedom. Two first (stator) terminals 6a and a second terminal 6b (directly connected to the detection mass 108) of the inertial sensor 6 enable, respectively, supply of reading signals $V_{S1}, V_{S2}$ to the detection mass 108 and detection of the displacements thereof. The first terminals 6a are capacitively coupled to the detection mass 108 in a known way, by comb-fingered electrodes (here not shown), while the second terminal 6b is directly connected to the mass.

The driving device 103 is connected to the microstructure 102 so as to form a feedback control loop 105, including the driving mass 107. As will be better clarified in the following description, the driving device 103 exploits the feedback control loop 105 to maintain the driving mass 107 in self-oscillation along the first axis X at its mechanical resonance frequency $\omega_R$ (for example, 25 krad/s).

The reading device 104 is of the open-loop type and, in the embodiment described here, is configured to carry out a so-called "single-ended" reading of the displacements of the detection mass 108 along the second axis Y. In particular, the reading device 104 has: first inputs 104a, connected to the driving device 103 for capturing detection signals $V_{RD1}, V_{RD2}$ (in this case voltages); a second input, connected to the second terminal 6b of the inertial sensor 6; first outputs, connected to respective first terminals 6a of the inertial sensor 6 and supplying reading signals $V_{S1}, V_{S2}$; and a second output 104b, which supplies an output signal $S_{OUT}$, correlated to the angular velocity $\Omega$ of the microstructure 102.

The gyroscope 100 operates in the way described hereinafter. The driving mass 107 is set in oscillation along the first axis X by the driving device 103. For this purpose, the driving device 103 is coupled to the reading outputs 5a of the actuation system 5 for receiving detection currents $I_{RD1}$, $I_{RD2}$, which are correlated to the linear velocity of oscillation of the driving mass 107 along the first axis X. On the basis of the detection currents $I_{RD1}$, $I_{RD2}$ the driving device 103 generates feedback driving voltages $V_{FBD1}$, $V_{FBD2}$ having amplitude and phase such as to ensure the conditions of oscillation of the feedback control loop 105 (unit loop gain and substantially zero phase).

The detection mass 108 is driven in motion along the first axis X by the driving mass 107. Consequently, when the microstructure 102 rotates about a gyroscopic axis perpendicular to the plane of the axes X, Y with a certain instantaneous angular velocity, the detection mass 108 is subjected to a Coriolis' force, which is parallel to the second axis Y and is proportional to the instantaneous angular velocity of the microstructure 102 and to the linear velocity of the two masses 107, 108 along the first axis X. More precisely, the Coriolis' force ($F_C$) is given by the equation:

$$F_C = 2M_S \Omega X'$$

where $M_S$ is the value of the detection mass 108, $\Omega$ is the angular velocity of the microstructure 102, and X' is the linear velocity of the two masses 107, 108 along the first axis X. As a result of driving at the resonance frequency $\omega_R$, the detection signals, caused by rotation of the gyroscope and correlated to the angular velocity, are in the form of signals with dual side band and suppressed carrier (DSB-SC; the carrier is in this case the linear velocity X' of oscillation of the driving mass and has a frequency equal to the mechanical resonance frequency $\omega_R$).

In effect, also the driving mass 107 is subjected to a Coriolis' force; however, the force is countered by the constraints that impose on the driving mass 107 movement exclusively along the first axis X.

The Coriolis' force and acceleration to which the detection mass 108 is subjected are read through the inertial sensor 6. In response to excitation of the detection mass 108 by means of the reading signals $V_{S1}$, $V_{S2}$, the inertial sensor 6 supplies detection charge packets $Q_{RS}$, which are proportional to the capacitive unbalancing caused by the displacement of the detection mass 108 along the second axis Y. The detection charge packets $Q_{RS}$ are hence correlated to the Coriolis' force (and acceleration) and to the instantaneous angular velocity of the microstructure 102. More precisely, the charge transferred with the detection charge packets $Q_{RS}$ in successive reading cycles is amplitude-modulated proportionally to the instantaneous angular velocity of the microstructure 102. The band of frequencies associated with the modulating quantity, i.e., the instantaneous angular velocity, is, however, much lower than the resonance frequency $\omega_R$ (for example, approximately 30 rad/s). Detection charge packets $Q_{RS}$ are converted and processed by the reading device 104, which generates the output signal $S_{OUT}$, as explained hereinafter.

Figure 4:
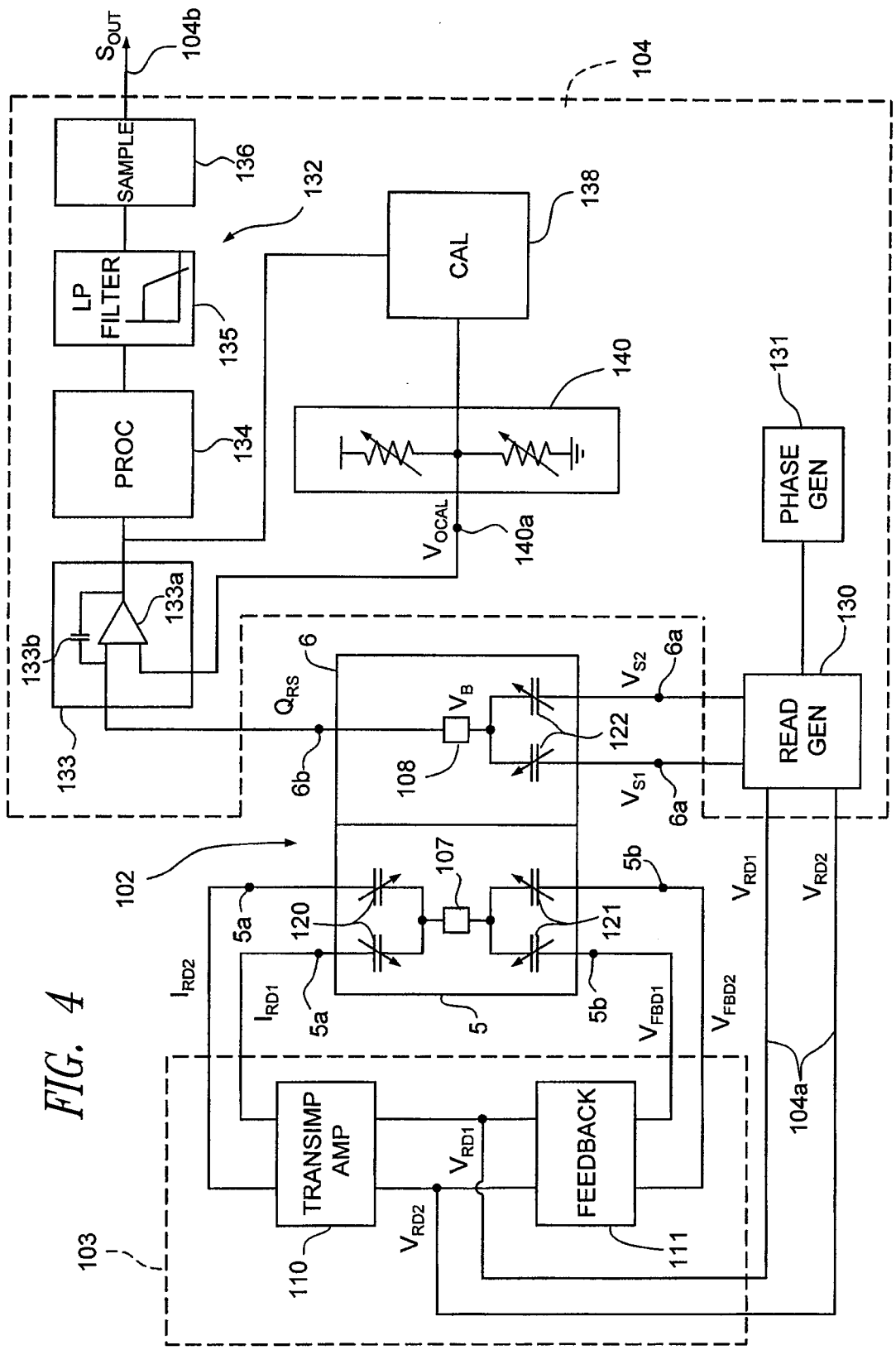
FIG. 4 is a more detailed block diagram of the micro-electro-mechanical gyroscope of FIG. 3.

FIG. 4 shows a more detailed diagram of the microstructure 102 of the driving device 103, and of the reading device 104.

As regards the microstructure 102, FIG. 4 shows first differential detection capacitances 120 present between the driving mass 107 and respective reading outputs 5a of the actuation system 5, actuation capacitances 121 present between the driving mass 107 and respective actuation inputs 5b of the actuation system 5, and second detection capacitances 122 present between the detection mass 108 and the second terminal 6b of the inertial sensor 6. More precisely, the first differential detection capacitances 120 and the differential actuation capacitances 121 have respective terminals connected to one and the same actuation node 125, which is in turn coupled to the actuation mass 108.

The driving device 103 includes a transimpedance amplifier 110 and a feedback stage 111, in itself known. The transimpedance amplifier 110 is of a fully differential type and has a pair of inputs connected to the reading outputs 5a of the actuation system 5 for receiving the detection currents $I_{RD1}$, $I_{RD2}$, which are correlated to the linear velocity of oscillation of the driving mass 107 along the first axis X. On the outputs of the transimpedance amplifier 110 detection voltages $V_{RD1}$, $V_{RD2}$ are hence present, which also indicate the linear velocity of oscillation of the driving mass 107 along the first axis X. Also the detection voltages $V_{RD1}$, $V_{RD2}$ are sinusoidal, oscillate at the resonance frequency $\omega_R$, have equal amplitude, and are 180° out of phase with respect to one another. The conditions of resonance are ensured by the feedback stage 111, which generates the feedback driving voltages $V_{FBD1}$, $V_{FBD2}$ in such a way that the gain of the feedback control loop 105 is a unitary gain and its phase is zero. The outputs of the transimpedance amplifier 110 are moreover connected to the reading device 104, for supply of the detection voltages $V_{RD1}$, $V_{RD2}$.

The reading device 104 is of the open-loop type and is configured for carrying out a so-called "single-ended" reading of the displacements of the detection mass 108 along the second axis Y. In this case, in particular, the detection mass 108 is excited by means of the two reading signals $V_{S1}$, $V_{S2}$, 180° out of phase with respect to one another (see also FIGS. 5a, 5b), which are supplied to respective first terminals 6a of the inertial sensor 6. In response to the reading signals $V_{S1}$, $V_{S2}$, the inertial sensor 6 generates detection charge packets $Q_{RS}$, which are supplied on the second terminal 6b. The detection charge packets $Q_{RS}$ are proportional to the capacitive unbalancing of the second detection capacitances 122, caused by the displacement of the detection mass 108 along the second axis Y.

The reading device 104 includes a generator of reading signals 130, a phase generator 131 and, moreover, a processing line 132 that includes a charge amplifier 133, an analog-processing stage 134, a filter 135 and a sampler 136. In addition, the reading device is provided with a calibration unit 138, of a numeric type, and of a calibration network 140.

Figure 5A:
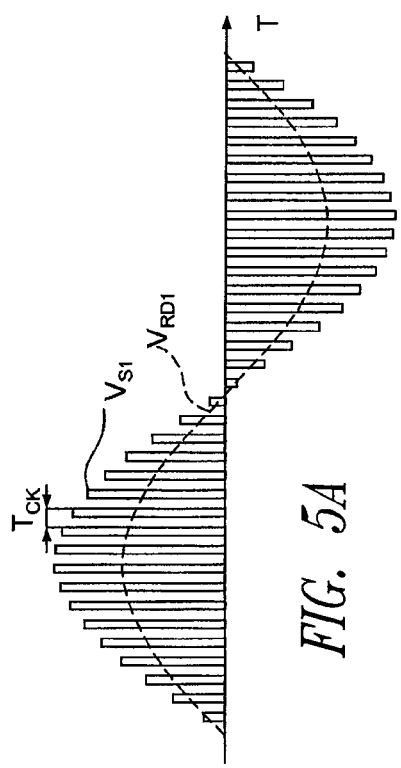
FIGS. 5A and 5B are graphs that represent quantities regarding the micro-electro-mechanical gyroscope of FIG. 3.
Figure 5B:
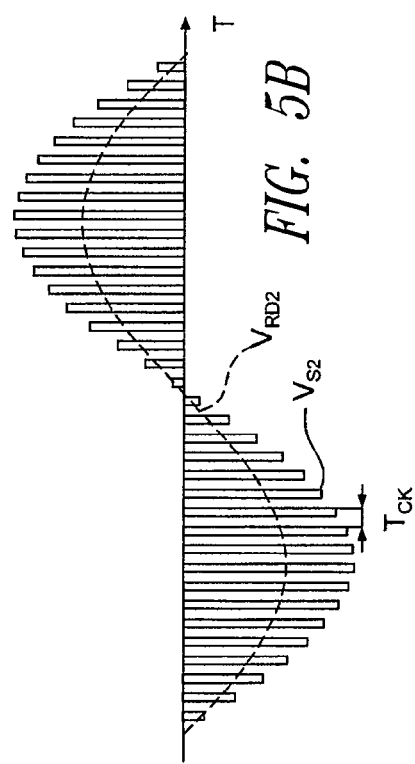

The generator of the reading signals 130 is a sampler and has a clock input, connected to the phase generator 131 for receiving a clock signal CK (with a clock period $T_{CK}$), and inputs forming the first inputs 104a of the reading circuit 104. In practice, then, the inputs are connected to the outputs of the transimpedance amplifier 110 of the driving device 103 and receive respective detection voltages $V_{RD1}$, $V_{RD2}$. The clock signal CK is asynchronous with respect to the oscillation of the driving mass 107 (in practice, the clock frequency $2\pi/T_C$ is not correlated to the resonance frequency $\omega_R$). Also the sampling performed by the generator of the reading signals 130 is hence asynchronous with respect to the resonance frequency $\omega_R$. Outputs of the generator of reading signals 130 are connected to respective first terminals 6a of the inertial sensor 6 and supply respective reading signals $V_{S1}$, $V_{S2}$. In particular, the reading signals $V_{S1}$, $V_{S2}$ are generated by sampling and amplification of respective detection signals $V_{RD1}$, $V_{RD2}$ and hence are in the form of square-wave signals of amplitude that is sinusoidally variable with the resonance frequency $\omega_R$, 180° out of phase with respect to one another, as shown in FIGS. 5a, 5b. More precisely, the reading signals $V_{S1}$, $V_{S2}$ are given by $$V_{S1}(t) = V_P \sin(\omega_R t + \phi) + V_B \quad (1)$$

$$V_{S2}(t) = -V_P \sin(\omega_R t + \phi) + V_B \quad (2)$$

where $V_P$ is a peak value, $\phi$ is the phase, and $V_B$ is a d.c. biasing voltage between the movable mass 108 and the stator 109 (which is zero in FIGS. 5a, 5b). In addition, in Eqs. (1) and (2), as in the remainder of the description, the variable t that indicates time is to be understood as being discrete.

The charge amplifier 133 includes an operational amplifier 133a and a capacitor 133b connected between a first input of the operational amplifier 133a and its output. The first input of the operational amplifier 133a, which defines an input of the charge amplifier 133, is connected to the second terminal 6b of the inertial sensor 6 for receiving the detection charge packets $Q_{RS}$ produced by the inertial sensor 6 in response to the reading signals $V_{S1}$, $V_{S2}$ and to rotation of the gyroscope 100. A second input of the operational amplifier 133a, which defines a second input of the charge amplifier 133, is, instead, connected to the calibration network 140.

The analog-processing stage 134, the filter 135, and the sampler 136 are cascaded to the charge amplifier 133 so as to process the detection charge packets $Q_{RS}$ (converted into voltage by the charge amplifier 133) and generate the output signal $S_{OUT}$.

The filter 135 is of a low-pass type and is configured to eliminate the high-frequency components ($2\omega_R$) and thus completing the demodulation process.

In the embodiment described herein, the calibration network 140 includes a resistive divider having variable division ratio and is controlled by the calibration unit 138. An output 140a of the calibration network 140 is connected to the second input of the charge amplifier 133 and supplies a calibration voltage $V_{OCAL}$. As a result of the internal feedback of the operational amplifier 133a, also the first input of the charge amplifier 133, the second terminal 6b of the inertial sensor 6, and the detection mass 108 are maintained at the calibration voltage $V_{OCAL}$. The second terminal 6b of the inertial sensor 6 is hence used as a calibration terminal. In particular, the calibration voltage $V_{OCAL}$ enables determination of the d.c. biasing voltage $V_B$ between the movable mass 108 and the stator 109.

The calibration unit 138 detects a charge-integration signal $S_{QI}$ in a point of the processing line 132 set downstream of the charge amplifier 133 and upstream of the filter 135. In the embodiment described herein, the charge-integration signal $S_{QI}$ is detected directly at output from the charge amplifier 133, upstream of the analog-processing stage 134. In a different embodiment, the charge-integration signal $S_{QI}$ may be detected at output from the analog-processing stage 134. In any case, the component at a frequency $2\omega_R$, which is twice the resonance frequency $\omega_R$, is still present in the charge-integration signal $S_{QI}$.

The calibration unit 138 extracts the component at frequency $2\omega_R$ from the charge-integration signal $S_{QI}$ and, on the basis of the component, sets the division ratio of the calibration network 140 and, consequently, the value of the calibration voltage $V_{OCAL}$, as explained hereinafter.

The reading device 104 operates as follows. The detection charge packets $Q_{RS}$ are generated by the inertial sensor 6 in response to excitation of the detection mass 108 by the reading signals $V_{S1}$, $V_{S2}$ and are proportional to the capacitive unbalancing of the second detection capacitances 122. The capacitive unbalancing is caused also by the amplitude of the reading signals $V_{S1}$, $V_{S2}$, as well as by the external forces acting on the detection mass 108. Consequently, the charge transferred with the detection charge packets $Q_{RS}$ is correlated, in particular through a proportional component, to the reading signals $V_{S1}$, $V_{S2}$, which vary at the resonance frequency $\omega_R$. In practice, the use of the reading signals $V_{S1}$, $V_{S2}$ for exciting the detection mass 108 intrinsically enables an operation of demodulation to be carried out. Consequently, signals deriving from the voltage conversion of the detection charge packets $Q_{RS}$, originally modulated with a carrier frequency given by the linear velocity X' (at the resonance frequency $\omega_R$), are signals already converted down to base band, precisely because the amplitude of the reading signals $V_{S1}$, $V_{S2}$ varies at the resonance frequency $\omega_R$. Advantageously, the demodulation does not need to be carried out by the processing line 132. In particular, it is possible to eliminate a demodulator stage and complex auxiliary circuits, such as the phase-locked (PLL) circuits, which would be otherwise necessary for synchronizing the operation of demodulation with the carrier frequency, i.e., the resonance frequency $\omega_R$.

The charge-integration signal $S_{QI}$ still contains, however, a component at frequency $2\omega_R$, which is generated by the operation of demodulation and is eliminated only through the low-pass filtering performed by the filter 135. The calibration unit 138 acts on the calibration network 140 for minimizing, through the calibration voltage $V_{OCAL}$, the component at frequency $2\omega_R$ because in this way it is possible to eliminate or reduce significantly at least some disturbance components superimposed on the useful signal. When the calibration unit 138 detects that the component at frequency $2\omega_R$ has been minimized, the calibration process is interrupted.

Figure 6:
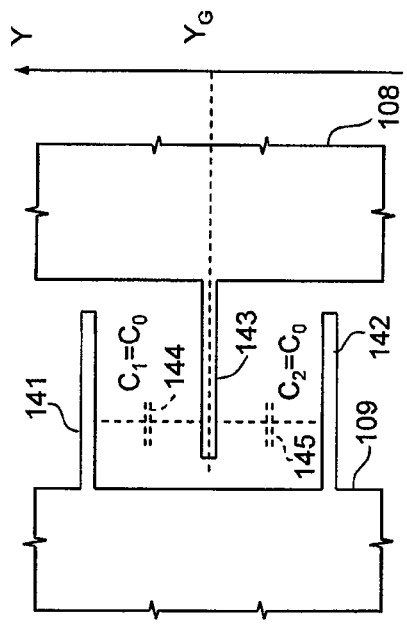
FIGS. 6 and 7 show a detail of the gyroscope of FIG. 3 in two different configurations.
Figure 7:
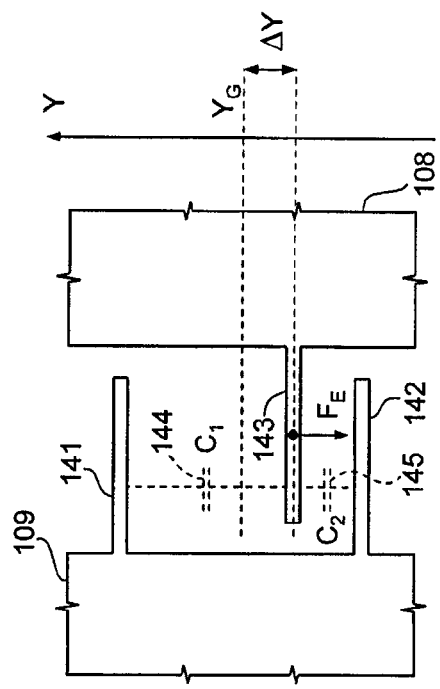

In this connection, reference may be made to FIGS. 6 and 7, which illustrate two stator electrodes 141, 142 and one detection electrode 143 of the detection mass 108. The detection electrode 143 is set between the stator electrodes 141, 142 so as to form two capacitors 144, 145, which have respective capacitances $C_1$, $C_2$. In a resting position (FIG. 6), the detection mass 108 is arranged in such a way that the detection electrode 143 is located at the same distance from the stator electrodes 141, 142, in particular at a distance $Y_G$. In the resting position, the capacitances $C_1$, $C_2$ are both equal to a resting capacitance $C_0$. When the movable mass 108 is out of its equilibrium position (for example, is displaced by a distance $\Delta Y$ towards the stator electrode 142, FIG. 7), the capacitances $C_1$, $C_2$ are unbalanced with respect to the resting capacitance $C_0$, and a non-zero electrostatic force $F_E$ acts on the detection electrode 143 as a result of the reading signals $V_{S1}$, $V_{S2}$ applied to the first terminals 6a. The electrostatic force $F_E$ moreover depends upon the (d.c.) biasing voltage $V_B$ between the movable mass 108 and the stator 109, which is caused by the calibration voltage $V_{OCAL}$.

In greater detail, indicating by $F_{E1}$ and $F_{E2}$ the electrostatic forces exerted on the detection electrode 143 by the stator electrode 141 and by the stator electrode 142, respectively, the resulting electrostatic force $F_E$ is given by $$|F_E(t)| = |F_{E1}(t) + F_{E2}(t)| \quad (3)$$
$$= \frac{C_0 Y_G [V_{S1}^2 (Y_G + \Delta Y)^2 - V_{S2}^2 (Y_G - \Delta Y)^2]}{2(Y_G + \Delta Y)^2 (Y_G - \Delta Y)^2}$$

Using Eqs. (1)-(3), the electrostatic force $F_E$ can also be expressed as follows:

$$|F_E(t)| = |\alpha(t) V_B^2 + \beta(t) V_B + \gamma(t)| \quad (4)$$

where, in the case of small displacements ($\Delta Y \ll Y_G$, a condition that is usually verified) the terms $\alpha(t)$, $\beta(t)$ and $\gamma(t)$ are respectively given by $$\alpha(t) \cong \frac{2C_0 \Delta Y}{Y_G^2}$$

$$\beta(t) \cong \frac{2C_0 V_P \sin(\omega_R t + \varphi)}{Y_G}$$

$$\Upsilon(t) \cong \frac{2C_0 \Delta Y V_P^2 \sin^2(\omega_R t + \varphi)}{Y_G^2}$$

Also in the absence of any disturbance, the electrostatic force $F_E$ applied to each detection electrode 143 is hence determined, through the biasing voltage $V_B$, from the calibration voltage $V_{OCAL}$.

As already explained, a large number of important sources of disturbance come in the form of a quadrature component, i.e., 90° out of phase with respect to the carrier (linear velocity X'). This is the case, for example, of a less than perfect alignment between the first (driving) axis X and the second (detection) axis Y. The quadrature component of disturbance, as a result of the coherence error in the demodulation process, results in a signal at a frequency $2\omega_R$, which is added to a d.c. signal.

In fact, the quadrature displacement $Y_Q$ along the second axis Y on account of the quadrature component is given by $$Y_Q = K_Q \cos \omega_R t$$

where $K_Q$ is a constant of proportionality. In addition, a quadrature charge variation corresponds to the quadrature displacement $Y_Q$ and is equal to $$\Delta Q_Q = K_Q' \cos \omega_R t \, V_P \sin(\omega_R t + \phi) = K_Q''(\sin 2\omega_R t \cos \phi + \cos 2\omega_R t \sin \phi + \sin \phi)$$

The charge variation induced by the electrostatic force $F_E$ is instead given by $$\Delta Q_E = K_E' |F_E(t)| V_P \sin(\omega_R t + \phi) = K_E' |\alpha(t) V_B^2 + \beta(t) V_B + \gamma(t)| V_P \sin(\omega_R t \phi)$$

Considering that, for the purposes of compensation of the quadrature error, the components $\alpha(t)$ and $\gamma(t)$ can normally be neglected, the charge variation induced by the electrostatic force $F_E$ can be expressed as follows:

$$\Delta Q_E = K_E'' V_B V_P (1 - \sin 2\omega_R t \cos \phi + \cos 2\omega_R t \sin \phi)$$

The charge variation induced by the electrostatic force $F_E$ can hence advantageously be exploited for minimizing the effects of the disturbance components at frequency $2\omega_R$. In particular, as already explained, the calibration voltage $V_{OCAL}$ is used by the calibration unit 138 for varying the biasing voltage $V_B$, until the component at frequency $2\omega_R$ of the charge-integration signal $S_{QI}$ is minimized. The quadrature error can thus be substantially eliminated upstream of the processing line 132, and the dynamics of the charge amplifier 133 can be optimized.

Figure 8:
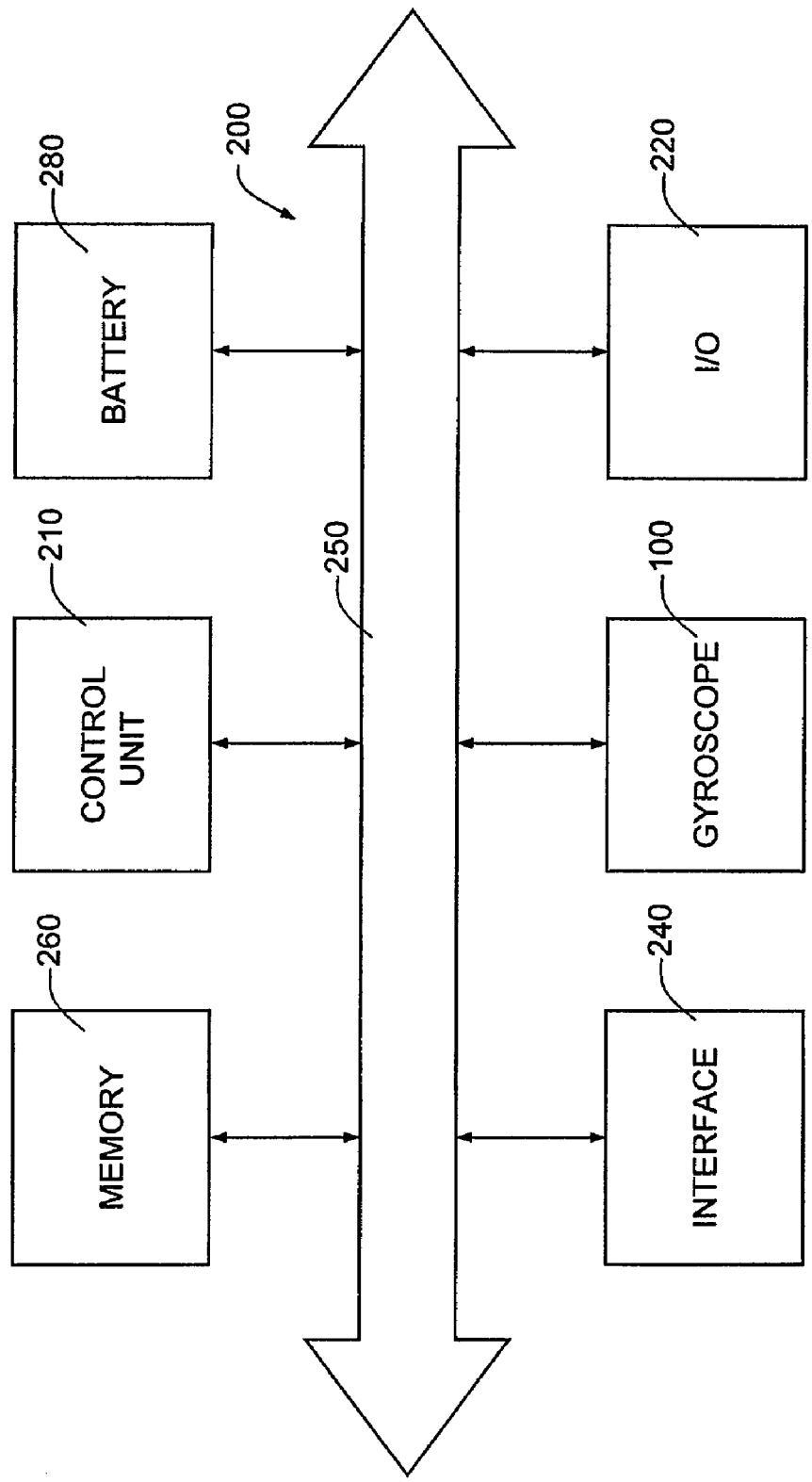
FIG. 8 is a simplified block diagram of an electronic system incorporating a micro-electro-mechanical gyroscope according to the present disclosure.

FIG. 8 illustrates a portion of a system 200 according to one embodiment of the present disclosure. The system 200 can be used in devices, such as, for example, a palm-top computer (personal digital assistant, PDA), a laptop or portable computer, possibly with wireless capacity, a cell phone, a messaging device, a digital music player, a digital camera, or other devices designed to process, store, transmit or receive information. For example, the gyroscope 100 can be used in a digital camera for detecting movements and carrying out an image stabilization. In other embodiments, the gyroscope 100 is included in a portable computer, a PDA, or a cell phone for detecting a free-fall condition and activating a safety configuration. In a further embodiment, the gyroscope 100 is included in a user interface activated by movement for computers or consoles for videogames.

The system 200 can include a controller 210, an input/output (I/O) device 220 (for example, a keyboard or a display), the gyroscope 100, a wireless interface 240, and a memory 260, whether of a volatile or non-volatile type, coupled to one another through a bus 250. In one embodiment, a battery 280 can be used for supply of the system 200. It is to be noted that the scope of the present disclosure is not limited to embodiments having necessarily one or all of the devices listed.

The controller 210 can include, for example, one or more microprocessors, microcontrollers and the like.

The I/O device 220 can be used for generating a message. The system 200 can use the wireless interface 240 for transmitting messages to and receiving messages from a wireless communication network with a radio frequency (RF) signal. Examples of wireless interface can include an antenna, and a wireless transceiver, such as a dipole antenna, even though the scope of the present disclosure is not limited from this standpoint. In addition, the I/O device 220 can supply a voltage representing what is stored either in the form of digital output (if digital information has been stored) or in the form of analog information (if analog information has been stored).

Finally, it is evident that modifications and variations can be made to the micro-electro-mechanical gyroscope and to the method described herein, without thereby departing from the scope of the present disclosure, as defined in the annexed claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A micro-electro-mechanical gyroscope, comprising:
    a first mass structured to be oscillatable according to a first axis with respect to a fixed body;
    an inertial sensor, including a second mass, structured to be driven by the first mass and constrained so as to oscillate according to a second axis in response to a rotation of the gyroscope;
    a driving device coupled to the first mass and structured to form a feedback control loop and configured to maintain the first mass in oscillation at a resonance frequency;
    an open-loop reading device coupled to the inertial sensor and structured to detect displacements of the second mass according to the second axis, the reading device including a charge amplifier structured to receive charge packets from the inertial sensor and convert the charge packets into a charge-integration signal, and a low-pass filter structured to filter the charge-integration signal; and a calibration stage structured to modify a biasing voltage between the second mass and the fixed body so as to minimize a component $2\omega_R$ at a frequency twice the resonance frequency in the charge-integration signal.

2. The gyroscope according to claim 1, wherein the calibration stage includes a calibration unit coupled to the charge amplifier and structured to detect the charge-integration signal, and a calibration network structured to be controlled by the calibration unit and coupled to the second mass to supply a calibration voltage.

3. The gyroscope according to claim 2, wherein the calibration network includes a resistive divider having a variable division ratio, and the charge amplifier includes an operational amplifier having a first input connected to the second mass and a second input connected to an output of the calibration network.

4. The gyroscope according to claim 2, wherein the calibration unit is configured to extract a component $2\omega_R$ at a frequency that is twice the resonance frequency from the charge-integration signal.

5. The gyroscope according to claim 2, wherein the calibration network includes a resistive divider having variable division ratio.

6. The gyroscope according to claim 1, wherein the reading device is configured to carry out a "single-ended" type reading of the inertial sensor.

7. The gyroscope according to claim 6, comprising a reading signal generator adapted to supply a first reading signal and a second reading signal to respective terminals of the inertial sensor, which are capacitively coupled to the second mass, and wherein the first and second reading signals have the form of square-wave signals having an amplitude that varies sinusoidally at the resonance frequency, respectively in phase and with a phase shift of 180° with respect to oscillations of the first mass along the first axis.

8. The gyroscope according to claim 7, wherein the driving device includes a transimpedance amplifier, which supplies detection signals indicating a velocity of oscillation of the first mass, and the reading signals generator has inputs connected to respective outputs of the transimpedance amplifier to receive respective detection signals.

9. The gyroscope according to claim 7, wherein the reading signals generator includes a sampler, and the first and second reading signals are generated by sampling respective detection signals.

10. The gyroscope according to claim 9, wherein the reading signals generator is structured to be timed for sampling the detection-voltage signals in a way that is asynchronous with respect to the resonance frequency.

11. A system, comprising:
a control unit that has a gyroscope, the gyroscope including:
 a first mass structured to be oscillatable according to a first axis with respect to a fixed body;
 an inertial sensor, including a second mass, structured to be driven by the first mass and constrained so as to oscillate according to a second axis in response to a rotation of the gyroscope;
 a driving device coupled to the first mass and structured to form a feedback control loop and configured to maintain the first mass in oscillation at a resonance frequency;
 an open-loop reading device coupled to the inertial sensor and structured to detect displacements of the second mass according to the second axis, the reading device including a charge amplifier structured to receive charge packets from the inertial sensor and convert the charge packets into a charge-integration signal, and a low-pass filter structured to filter the charge-integration signal; and
 a calibration stage structured to modify a biasing voltage between the second mass and the fixed body so as to minimize a component $2\omega_R$ at a frequency twice the resonance frequency in the charge-integration signal.

12. The gyroscope according to claim 11, wherein the calibration stage includes a calibration unit coupled to the charge amplifier and structured to detect the charge-integration signal, and a calibration network structured to be controlled by the calibration unit and coupled to the second mass to supply a calibration voltage.

13. The gyroscope according to claim 12, wherein the calibration network includes a resistive divider having a variable division ratio, and the charge amplifier includes an operational amplifier having a first input connected to the second mass and a second input connected to an output of the calibration network.

14. The gyroscope according to claim 12, wherein the calibration unit is configured to extract a component $2\omega_R$ at a frequency that is twice the resonance frequency from the charge-integration signal.

15. The gyroscope according to claim 12, wherein the calibration network includes a resistive divider having variable division ratio.

16. The gyroscope according to claim 11, wherein the reading device is configured to carry out a "single-ended" type reading of the inertial sensor.

17. The gyroscope according to claim 16, comprising a reading signal generator adapted to supply a first reading signal and a second reading signal to respective terminals of the inertial sensor, which are capacitively coupled to the second mass, and wherein the first and second reading signals have the form of square-wave signals having an amplitude that varies sinusoidally at the resonance frequency, respectively in phase and with a phase shift of 180° with respect to oscillations of the first mass along the first axis.

18. The gyroscope according to claim 17, wherein the driving device includes a transimpedance amplifier, which supplies detection signals indicating a velocity of oscillation of the first mass, and the reading signals generator has inputs connected to respective outputs of the transimpedance amplifier to receive respective detection signals.

19. A method for controlling a micro-electro-mechanical gyroscope, comprising the steps of:
providing a first mass oscillatable according to a first axis;
coupling an inertial sensor having a second mass to the first mass in such a way that the second mass is driven by the first mass and oscillates according to a second axis in response to a rotation of the gyroscope;
feedback controlling a movement of the first mass for maintaining the first mass in oscillation at a resonance frequency;
open-loop detecting displacements of the second mass according to the second axis, wherein open-loop detection comprises converting charge packets generated by the inertial sensor into a charge-integration signal and low-pass filtering the charge-integration signal; and
modifying a biasing voltage between the second mass and a fixed body so as to minimize a component $2\omega_R$ at a frequency that is twice the resonance frequency in the charge-integration signal where $\omega_R$ represents the resonance frequency.

20. The method according to claim 19, wherein modifying the bias voltage comprises detecting the charge-integration signal, and supplying to the second mass a calibration voltage correlated to the charge-integration signal.

21. The method according to claim 20, comprising extracting a component $2\omega_R$ at a frequency that is twice the resonance frequency from the charge-integration signal.

22. The method according to claim 19, comprising carrying out a "single-ended" type reading of the inertial sensor.

23. The method according to claim 22, comprising supplying a first reading signal and a second reading signal to respective terminals of the inertial sensor, which are capacitively coupled to the second mass, wherein the first and second reading signals have the form of square-wave signals having an amplitude that varies sinusoidally at the resonance frequency, respectively in phase and with a phase shift of 180° with respect to oscillations of the first mass along the first axis.

24. The method according to claim 23, comprising supplying detection signals indicating a velocity of oscillation of the first mass and sampling the detection signals for generating the first and second reading signal.

25. The method according to claim 24, wherein the detection-voltage signals are sampled asynchronously with respect to the resonance frequency.

26. A device, comprising:
an inertial sensor coupled to a detection mass that is driven by a first mass that oscillates at a resonance frequency with respect to a fixed body, the inertial sensor adapted to output detection charge packets in response to movement of the detection mass; and
an open loop reading device coupled to the inertial sensor to receive the detection charge packets and configured to process the detection charge packets and generate an output signal, the reading device having a calibration circuit structured to modify a biasing voltage between the detection mass and the fixed body so as to reduce a frequency component $2\omega_R$ at a frequency twice the resonance frequency in the output signal where $\omega_R$ is the resonance frequency.

27. The device of claim 26, wherein the reading device includes a charge amplifier coupled to the calibration circuit, the charge amplifier structured to receive the detection charge packets and to generate a charge-integration signal in response thereto, the calibration circuit structured to receive the charge integration signal from the charge amplifier circuit and to generate in response thereto a calibration voltage, and the charge amplifier structured to receive the calibration voltage and to determine a bias voltage for the detection mass.

28. The device of claim 27, wherein the calibration circuit comprises a resistive divider having a variable division ratio, and the charge amplifier comprises an operational amplifier having a first input connected to the detection mass and a second input connected to an output of the calibration circuit.

29. The device of claim 26, wherein the reading device is configured to carry out a single-ended type reading of the inertial sensor.

30. The device of claim 29, wherein the reading device comprises a reading signal generator adapted to supply a first reading signal and a second reading signal to respective first and second terminals of the inertial sensor, which are capacitively coupled to the detection mass, and wherein the first and second reading signals are in the form of square-wave signals having an amplitude that varies sinusoidally at the resonant frequency.

31. The device of claim 30, wherein the first and second reading signals vary sinusoidally and at the resonance frequency, respectively in phase and with a phase shift of 180° with respect to oscillations of a driving mass along a first axis, the driving mass coupled to the detection mass.

32. A device, comprising:
an inertial sensor coupled to a detection mass that oscillates at a resonance frequency, the inertial sensor adapted to output detection charge packets in response to movement of the detection mass; and
a reading device coupled to the inertial sensor to receive the detection charge packets and configured to process the detection charge packets and generate an output signal that has frequency components of twice the resonance frequency removed therefrom, wherein the reading device includes a charge amplifier and a calibration circuit coupled to the charge amplifier, the charge amplifier structured to receive the detection charge packets and to generate a charge-integration signal in response thereto, and the calibration circuit structured to receive the charge-integration signal from the charge amplifier circuit and to generate in response thereto a calibration voltage, and the charge amplifier structured to receive the calibration voltage and to determine a bias voltage for the detection mass.

33. The device of claim 32, wherein the calibration circuit comprises a resistive divider having a variable division ratio, and the charge amplifier comprises an operational amplifier having a first input connected to the detection mass and a second input connected to an output of the calibration circuit.

34. The device of claim 32, wherein the reading device is configured to carry out a single-ended type reading of the inertial sensor.

35. The device of claim 32, wherein the reading device comprises a reading signal generator adapted to supply a first reading signal and a second reading signal to respective first and second terminals of the inertial sensor, which are capacitively coupled to the detection mass, and wherein the first and second reading signals are in the form of square-wave signals having an amplitude that varies sinusoidally at the resonant frequency.

36. The device of claim 35, wherein the first and second reading signals vary sinusoidally and at the resonance frequency, respectively in phase and with a phase shift of 180° with respect to oscillations of a driving mass along a first axis, the driving mass coupled to the detection mass.

* * * * *